US006260472B1

(12) United States Patent
Zhu et al.

(10) Patent No.: US 6,260,472 B1
(45) Date of Patent: Jul. 17, 2001

(54) ONE-PIECE INTEGRAL SKIRT PISTON AND METHOD OF MAKING THE SAME

(75) Inventors: Xiluo Zhu, Canton; Richard R. Gofton, Tecumseh, both of MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/123,677

(22) Filed: Jul. 28, 1998

(51) Int. Cl.[7] .......... F16J 1/04
(52) U.S. Cl. .......... 92/214; 92/224; 92/231
(58) Field of Search .......... 92/208, 214, 224, 92/231, 260

(56) References Cited

U.S. PATENT DOCUMENTS

| | | | | |
|---|---|---|---|---|
| 4,286,505 | * | 9/1981 | Amdall | 92/186 |
| 4,532,686 | * | 8/1985 | Berchem | 29/156.5 R |
| 4,581,983 | | 4/1986 | Moebus . | |
| 4,989,559 | | 2/1991 | Fletcher-Jones . | |
| 5,150,517 | | 9/1992 | Martins Leites et al. . | |
| 5,359,922 | | 11/1994 | Martins Leites . | |
| 5,778,846 | | 7/1998 | Mielke . | |

FOREIGN PATENT DOCUMENTS

| | | |
|---|---|---|
| WO 9620340 | 7/1996 | (WO) . |

* cited by examiner

*Primary Examiner*—Edward K. Look
*Assistant Examiner*—Thomas E. Lazo
(74) *Attorney, Agent, or Firm*—Reising, Ethington, Barnes, Kisselle, Learman & McCulloch. P.C.

(57) ABSTRACT

A one-piece piston (20) formed by an upper crown (28) and a lower crown (30) having an integral skirt (24, 26). The upper crown (28) includes an upper surface (32) and a lower surface (34, 42). The lower crown (30) includes an upper surface (50) and two pin bosses (52, 54). The upper crown (28) has a first collar (44) and the lower crown (30) has a second collar (64). In addition, skirt ribs (24, 26) connect the two pin bosses (52, 54). The first and second collars (44, 64) are secured together to form the one-piece piston (20).

1 Claim, 2 Drawing Sheets

FIG-3
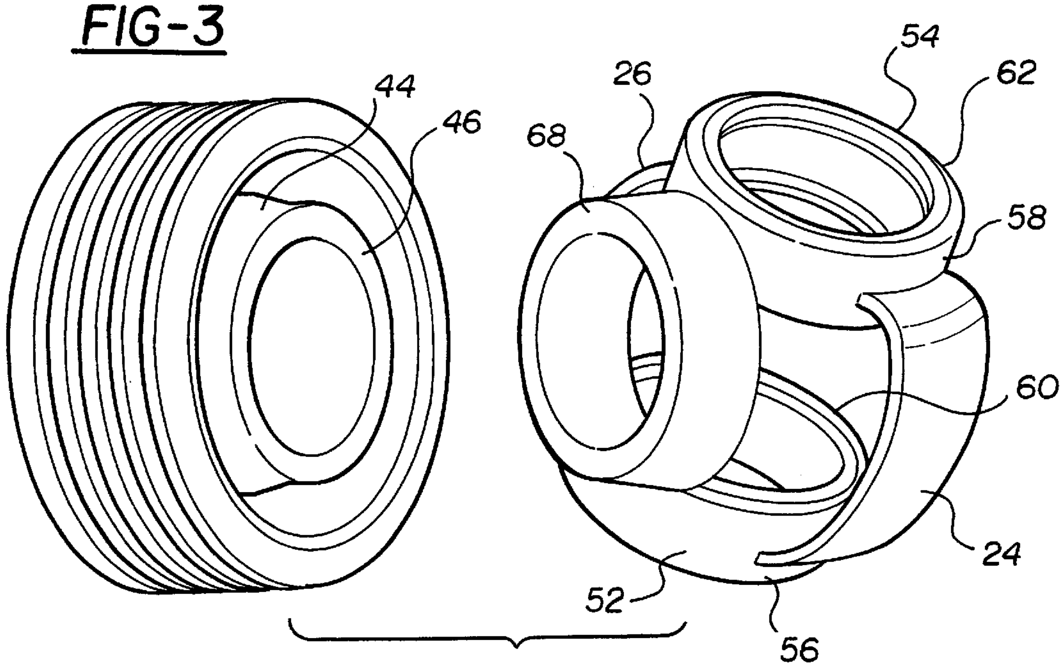
FIG-4
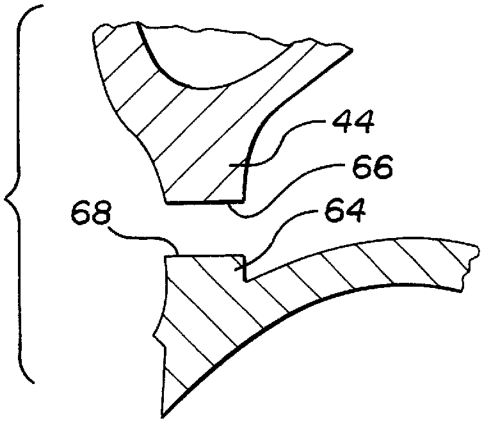
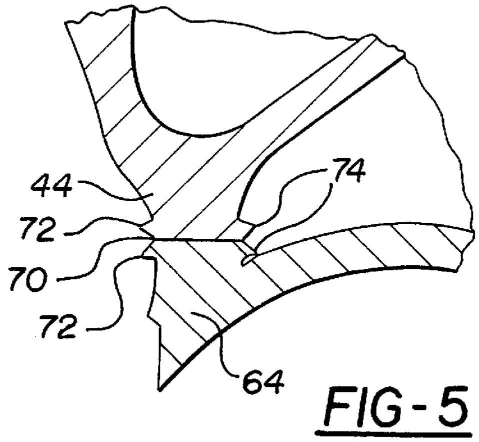
FIG-5
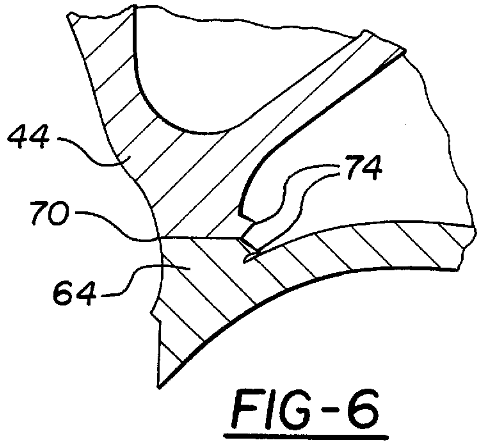
FIG-6

ONE-PIECE INTEGRAL SKIRT PISTON AND METHOD OF MAKING THE SAME

FIELD OF THE INVENTION

The present invention relates to a piston for internal combustion engines and in particular, to a one-piece piston having an upper crown and a lower crown with an integral skirt and a method of making the same.

BACKGROUND OF THE INVENTION

It is known to use one-piece pistons for internal combustion engines. Typically, one-piece pistons have a crown connected to a skirt.

It is known to forge the crown and skirt as one-piece. The forged one-piece piston is then machined to form the component parts of the crown such as piston ring grooves and an annular wall having a recess about its periphery. The annular wall is an outer portion which extends downwardly from the bottom of a piston ring zone to an apex of a piston pin bore. The remaining outer portion material defines a skirt.

Forging the crown and skirt as one-piece undesirably requires excess material during the forming process that must later be machined away. To create the annular recess, for example, an area approximately the height of an upper crown must be removed. Machining away the excess to form the component parts of the one-piece piston, therefore, can be both cumbersome and expensive.

The weight of the piston depends on the weight of the single piece of forged material. Using less material, however, may ultimately decrease the utility and strength of the piston. Using commercially available lighter material such as aluminum tends to impose design constraints, such as the depth of the combustion bowls and the location of the ring grooves.

Additionally, the piston crown endures at least two separate loads in service. The upper crown endures both thermal and mechanical loads created by the combustion gas gathered in the combustion bowl at the top of the upper crown. The lower crown, however, endures a side load from the motion of the crankshaft. In the forged piston, the strength needed to endure the two different loads is determined by the strength of the single material chosen. While steel, for example, is strong enough to handle both loads, its weight and expense makes it inefficient for many applications.

SUMMARY OF THE INVENTION

The present invention is directed to a one-piece piston having an upper and a lower crown with an integral skirt and a method of making the same. The upper crown has an upper surface connected to a lower surface by an outer sidewall. The lower crown has an upper surface and first and second downwardly projecting pin bosses for receiving a wrist pin. The first and second pin bosses have corresponding first and second outer surfaces. A first skirt rib extends from the first outer surface of the first pin boss to the corresponding first outer surface of the second pin boss. A second skirt rib extends from the second outer surface of the first pin boss to the corresponding second outer surface of the second pin boss.

A first collar extends downwardly from the lower surface of the upper crown. Similarly, a second collar extends upwardly and defines the upper surface of the lower crown. Finally, the second collar is friction-welded to the first collar in an opposing facing relationship to form the one-piece piston. It should be understood, however, that other means of securing the first and second collars may be employed.

The present invention is made by forming the upper crown from a first material and the lower crown from a second material. It is preferred that the first and second materials be the same. However, they can also be different.

Thus, the present invention increases flexibility in manufacturing and design. The present invention also reduces the amount of scrap material.

Further, the present invention allows flexibility in fabrication techniques and types of material. For instance, without limitation, the upper and lower crowns can be both forged, both cast or one forged and one cast. The present invention also can optimize the weight and load of each component providing the ability to sustain higher peak combustion pressures.

The one-piece integral skirt configuration of the present invention increases the flexibility of design, the ease of manufacturing, and cost-effective, efficient use of material.

BRIEF DESCRIPTION OF THE DRAWINGS

The features and inventive aspects of the present invention will become more apparent upon reading the following detailed description, claims, and drawings, of which the following is a brief description:

FIG. 3 is an exploded view of a piston assembly according to the present invention.

FIG. 4 is a partial cross-section of a first and second collar in an opposing facing relationship according to the present invention.

FIG. 5 is a partial cross-section of a friction-weld of the first and second collars.

FIG. 6 is a partial cross-section of a friction-weld of the first and second collars where an outer flashing has been machined away.

DETAILED DESCRIPTION OF A PREFERRED EMBODIMENT

Figure 1:
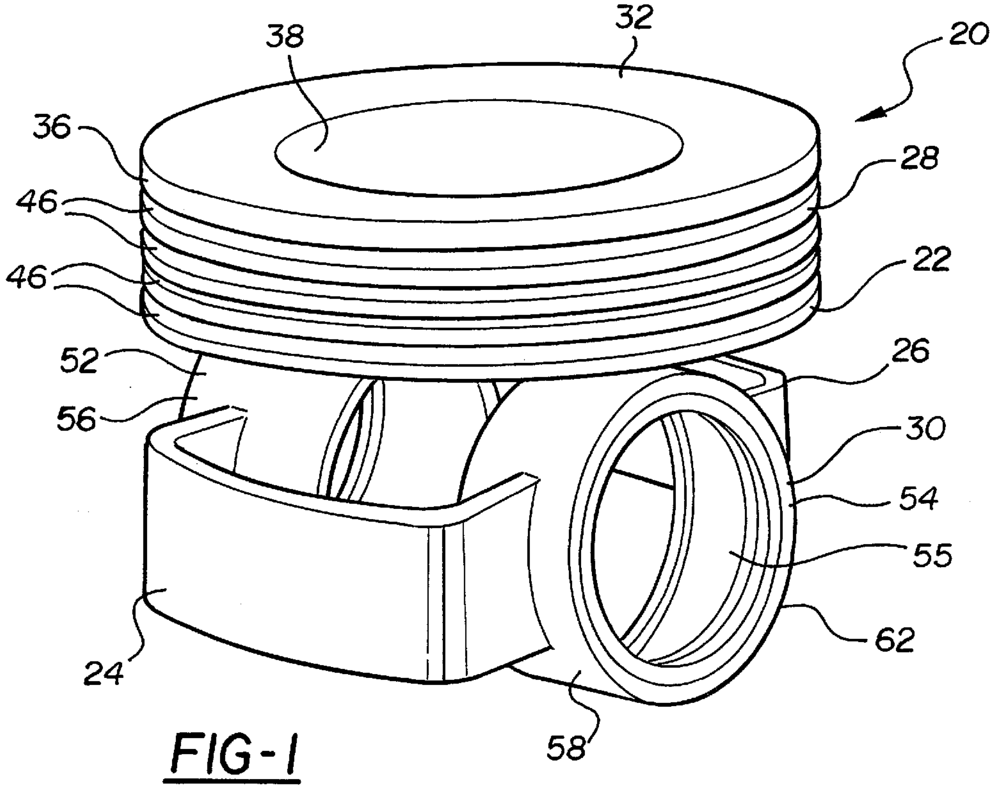
FIG. 1 is a perspective view of a piston assembly according to the present invention.
Figure 2:
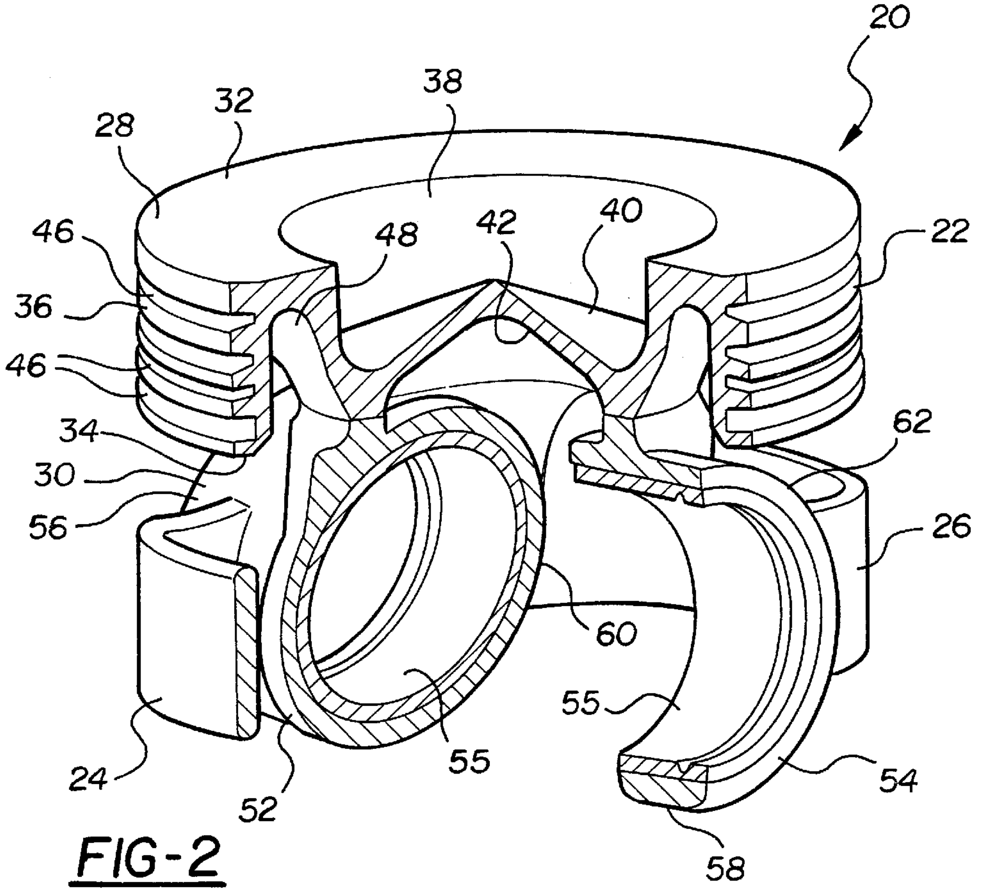
FIG. 2 is a sectioned perspective view of the piston of FIG. 1.

FIGS. 1 and 2 show a piston 20 of the present invention for use in internal combustion engines. Piston 20 is a one-piece piston having a crown portion 22 integral with first and second skirt portions or ribs 24, 26. Crown portion 22 includes an upper crown member (or upper crown) 28 connected to a lower crown member (or lower crown) 30, as for example, by friction-welding. However, any suitable connecting techniques (e.g. fastening) may be employed.

Upper crown 28 has a central body portion with an upper surface 32 connected to a lower surface 34 of an outer annular sidewall 36 depending from the body portion as outer sidewall 36. Preferably, upper crown 28 of piston 20 is manufactured from a suitable steel forging (e.g., without limitation, AISI type SAE 4140) to provide high strength and relatively low cost. In addition, lower crown 30 is manufactured from suitable steel (e.g., without limitation, AISI type SAE 4140) to provide strength and low cost. However, any suitable materials or fabricating techniques can be used. Preferably, upper surface 32 of upper crown 28 is suitably contoured to define a combustion bowl 38 which has an undulating upper surface 40 and, in one embodiment, a generally corresponding lower surface 42 (FIG. 2). Upper surface 32 of upper crown 28 can be fabricated without combustion bowl 38 and undulating upper surface 40.

Lower surface 42 includes a downwardly projecting first annular connecting colar 44 spaced radially inwardly from the sidewall 36. Preferably, outer sidewall 36 has at least one piston ring groove 46 formed therein.

If upper crown 28 is made from a lighter material than steel (e.g. aluminum), outer sidewall 36 may have to be reinforced to accommodate piston ring grooves 46. Similarly, lighter material (e.g. aluminum) in upper crown 28 may decrease the depth of combustion bowl 38. A partial cooling chamber 48 is formed in lower surface 42 of upper crown 28 between sidewall 36 and first collar 44. Cooling chamber 48 can be opened or closed depending on design requirements.

As shown, lower crown 30 is separately manufactured as a discrete component apart from the upper crown 28. The lower crown 30 includes first and second pin bosses 52, 54 that each have a pin bore 55 for receiving a wrist pin (not shown) that is connected to a connecting rod (not shown). First and second pin bosses 52, 54 have generally arcuate profiles including corresponding first outer surfaces 56, 58 and corresponding second outer surfaces 60, 62. However, first and second bosses 52, 54 any suitable profile. A second annular connecting collar 64 is formed as one piece with the pin bosses 52, 54 and extends upwardly therefrom to define an upper joining surface 68. Second collar 64 is positioned to align respectively with a joining surface 66 of the first collar 44 of upper crown 28 to facilitate attachment using, for example, welding. The joining surfaces 66, 68 are provided at corresponding free ends of the collars 44, 64, respectively.

FIG. 2 also partially shows a first skirt rib 24 extending from first outer surface 56 of first pin boss 52. Similarly, a second skirt rib 26 extends from second outer surface 60 of first pin boss 52 to corresponding second outer surface 62 of second pin boss 54. First and second skirt ribs 24, 26 are spaced away from lower surface 34 of upper crown 28. Preferably, first and second skirt ribs 24, 26 are located in a middle portion of first and second pin bosses 52, 54.

FIG. 3 shows an exploded view of one-piece piston 20 with upper and lower crown portions 28, 30 in their pre-joined state as separate components. First skirt rib 24 extends from first outer surface 56 of first pin boss 52 to corresponding first outer surface 58 of second pin boss 54. First skirt rib 24 acts as an integral first support against side loading for pin bosses 52, 54. Preferably, for additional support, second skirt rib 26 also extends from first pin boss 52 to second pin boss 54.

FIG. 4 shows a partial cross-section of first collar 44 and second collar 64 in an opposing facing relationship according to the present invention. As shown, first collar 44 has the bottom face 66 and second collar 64 has the top face 68. Bottom face 66 is joined to top face 68 to form one-piece piston 20. In one preferred embodiment joining is accomplished using conventional friction-welding techniques.

FIG. 5 shows a partial cross-section of friction-weld 70 of first collar 44 and second collar 64. The area surrounding friction-weld 70 has outer and inner flashing 72, 74. Preferably, in the final stages of manufacturing, outer flashing 72 is removed, such as by machining (shown in FIG. 6). It is optional whether to machine away inner flashing 74.

The following discussion details the manufacture of one-piece piston 20. The skilled artisan will appreciate that process sequence is variable and the embodiment described is not intended as limiting. First, upper crown 28 is forged from a block of steel. Upper crown 28, preferably, has an outer diameter of approximately 120 to 300 mm and a height of 40 to 80 mm. The forging process includes forming upper surface 32, sidewall 36, and lower surface 34. Upper crown 28 could likewise be cast or otherwise suitably fabricated. Likewise, other suitable metals may be used. Steel (e.g., without limitation, AISI type SAE 4140) is preferred, however, for its abilities to generally endure greater thermal loading and accommodate deeper combustion bowls 38.

By contrast, it is preferred that lower crown 30 be formed from steel (e.g., without limitation, AISI type SAE 4140) with an outer diameter of approximately 120 to 300 mm and a height of approximately 70 to 250 mm. Other light metals may also substitute for steel. Forging lower crown 30 includes forming upper surface 50 and first and second pin bosses 52, 54 for receiving a wrist pin (not shown). The method of making piston 20 increases flexibility in design and manufacturing and allows forming of skirt ribs 24, 26 very economically. Fabricating upper and lower crowns 28, 30 separately also produces less scrap. Pin bore 55 is formed for example by drilling through first and second pin bosses 52, 54.

As shown in FIGS. 1 and 2, first skirt rib 24 is integrally formed extending from first outer surface 56 of first pin boss 52 to first corresponding outer surface 58 of second pin boss 54. Second skirt rib 26 is also integrally formed extending from second outer surface 60 of first pin boss 52 to second corresponding outer surface 62 of second pin boss 54. First and second skirt ribs 24, 26 are formed using conventional techniques such as forging and casting. However, any suitable techniques may be used.

In addition, first collar 44 is provided extending downwardly from lower surface 34 of upper crown 28. Similarly, second collar 64 is also provided extending upwardly from lower crown 30. Finally, second collar 64 is, preferably, friction-welded to first collar 44 to form a friction weld joint 70 one-piece piston 20.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of making a piston having a crown and a skirt formed as one piece with the crown, said method comprising:

forming a single piece upper crown member having a central body portion, an outer annular sidewall depending from said body portion for receiving at least one ring groove, and an annular connecting collar depending from said body portion in radially inwardly spaced relation to said sidewall and presenting a joining face at a lower free end thereof;

forming a single piece lower crown member as a discrete component separate from said upper crown member and including, as part of the one piece lower crown member structure, a pair of pin boss portions, a pair of oppositely disposed skirt portions formed as one piece with and bridging said pin boss portions, and an annular connecting collar extending upwardly from the pin boss portions and presenting a joining face at a free end thereof;

bringing the aligned joining face of the upper crown member into engagement with the joining face of the lower crown member; and friction-welding the connecting collars together to produce a permanent friction-weld joint across the joining faces in such manner as to secure the upper crown member intimately to the lower crown member to provide a resultant unified one-piece construction of the joined crown members, and wherein during the step of friction welding, forming a resultant flashing of material at the joining faces extending circumferentially about the connecting collars and projecting radially outwardly of the connecting collars toward said skirt portions.

* * * * *

UNITED STATES PATENT AND TRADEMARK OFFICE

CERTIFICATE OF CORRECTION

PATENT NO. : 6,260,472 B1
DATED : July 17, 2001
INVENTOR(S) : Xiluo Zhu and Richard R. Gofton It is certified that error appears in the above-identified patent and that said Letters Patent is hereby corrected as shown below:

Title page,
Item [56], References Cited, U.S. PATENT DOCUMENTS, insert
-- 4,161,165 7/1979 Belush et al --.

Column 2,
Line 54, after "as" insert -- shown best in Figure 2 --;
Line 55, cancel "outer sidewall 36".

Column 3,
Line 2, change "colar" to -- collar --;
Line 22, after "52, 54" insert -- may have --.

Signed and Sealed this

Twenty-second Day of October, 2002

*Attest:*

JAMES E. ROGAN

*Attesting Officer* *Director of the United States Patent and Trademark Office*

US006260472C1

(12) EX PARTE REEXAMINATION CERTIFICATE (6968th)
United States Patent
Zhu et al.

(10) Number: US 6,260,472 C1
(45) Certificate Issued: Aug. 4, 2009

(54) ONE-PIECE INTEGRAL SKIRT PISTON AND METHOD OF MAKING THE SAME

(75) Inventors: Xiluo Zhu, Canton, MI (US); Richard R. Gofton, Tecumseh, MI (US)

(73) Assignee: Federal-Mogul World Wide, Inc., Southfield, MI (US)

Reexamination Request:
No. 90/006,284, May 8, 2002
No. 90/006,384, Sep. 16, 2002

Reexamination Certificate for:

| | |
|---|---|
| Patent No.: | **6,260,472** |
| Issued: | **Jul. 17, 2001** |
| Appl. No.: | **09/123,677** |
| Filed: | **Jul. 28, 1998** |

Certificate of Correction issued Oct. 22, 2002.

(51) Int. Cl.
*F16J 1/04* (2006.01)

(52) U.S. Cl. ................................ 92/214; 92/224; 92/231

(58) Field of Classification Search .................... 92/208, 92/214, 224, 231, 260
See application file for complete search history.

(56) References Cited

U.S. PATENT DOCUMENTS

| | | | | | |
|---|---|---|---|---|---|
| 3,323,503 | A | * | 6/1967 | Grosshans et al. | 92/224 |
| 4,161,165 | A | * | 7/1979 | Belush et al. | 123/193 |
| 4,286,505 | A | * | 9/1981 | Amdall | 92/186 |
| 4,532,686 | A | * | 8/1985 | Berchem | 92/220 |
| 4,793,542 | A | | 12/1988 | Farrenkopf et al. | |
| 4,941,440 | A | * | 7/1990 | Weber et al. | 123/193.6 |
| 5,359,922 | A | * | 11/1994 | Martins Leites et al. | 92/189 |

FOREIGN PATENT DOCUMENTS

| | | | | |
|---|---|---|---|---|
| DE | 3032671 | * | 3/1982 | 92/186 |
| DE | 243 530 | | 4/1987 | |
| JP | 07293326 | | 7/1996 | |

OTHER PUBLICATIONS

American Welding Scociety, Inc "Friction Welding of Materials" (1962) pp. 2–7.*

1994 Diesel & Gas Turbine World Wide, Sulzer Publication.

1994 Diesel & Gas Turbine World Wide, Man B&W Article.

Grünauer, Heinz, "Praktische Erfarhungen mit dem Reibschweissen von Aluminium," Die Fachpresse berichtet, Aluminium Weldments III, 3rd Intn'l Conf on Aluminium Weldments, Apr. 15–17, 1985, paragraph 2.2.

A.W.E. Nentwig, H. Grünauer, "Einsatzmöglichkeiten des Reibschweissens unde Schweissens mit magnetisch bewegtem Licntbogen", Die Fachpresse berichtet, Dondertruck aus DVS berichte, 1990, Band 134, Seite 11–18, paragraph 1.

* cited by examiner

*Primary Examiner*—Matthew C. Graham

(57) ABSTRACT

A one-piece piston (20) formed by an upper crown (28) and a lower crown (30) having an integral skirt (24, 26). The upper crown (28) includes an upper surface (32) and a lower surface (34, 42). The lower crown (30) includes an upper surface (50) and two pin bosses (52, 54). The upper crown (28) has a first collar (44) and the lower crown (30) has a second collar (64). In addition, skirt ribs (24, 26) connect the two pin bosses (52, 54). The first and second collars (44, 64) are secured together to form the one-piece piston (20).

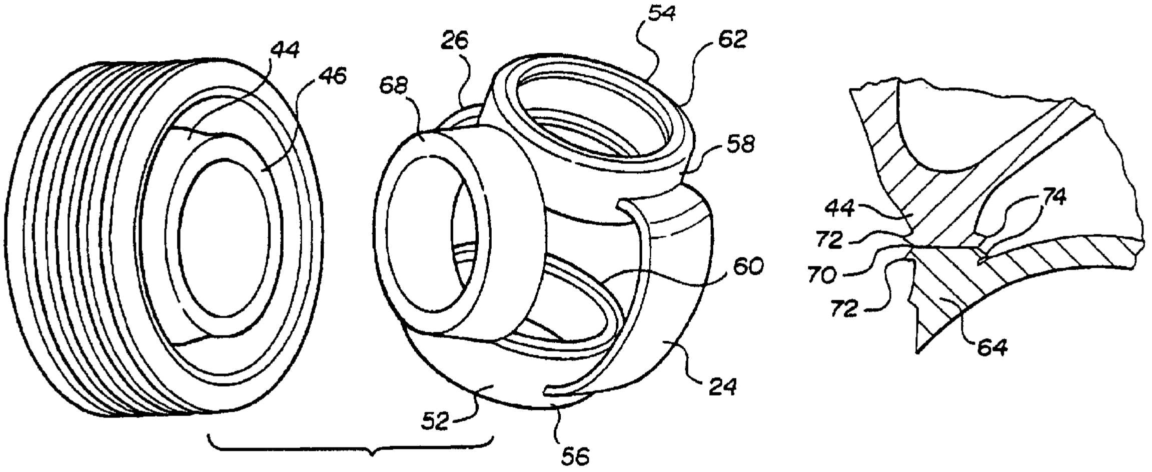

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

New claims 2–6 are added and determined to be patentable.

*2. A method of making a piston having a crown and a skirt formed as one piece with the crown, said method comprising: forming a single piece upper crown member of steel having a central body portion, an outer annular sidewall depending from said body portion for receiving at least one ring groove, and an annular connecting collar depending from said body portion in radially inwardly spaced relation to said sidewall and presenting a joining face at a lower free end thereof; forming a single piece lower crown member of steel as a discrete component separate from said upper crown member and including, as part of the one piece lower crown member structure, a pair of pin boss portions, a pair of oppositely disposed skirt portions formed as one piece with and bridging said pin boss portions, and an annular connecting collar extending upwardly from the pin boss portions and presenting a joining face at a free end thereof; bringing the aligned joining face of the upper crown member into engagement with the joining face of the lower crown member; and friction-welding the connecting collars together to produce a permanent friction-weld joint across the joining faces in such manner as to secure the upper crown member intimately to the lower crown member to provide a resultant unified one-piece construction of the joined crown members, and wherein during the step of friction welding, forming a resultant flashing of material at the joining faces extending circumferentially about the connecting collars and projecting radially outwardly of the connecting collars toward said skirt portions, wherein a lower surface of the outer annular wall is spaced from the friction weld joint following friction welding and wherein the flashing of material projecting radially outwardly from the connecting collars is removed following welding.*

*3. The method of claim 2 wherein access for the removal of the flashing of material projecting radially outwardly from the connecting collars is provided below the lower surface of the outer annular wall.*

*4. A method of making a piston having a crown and a skirt formed as one piece with the crown, said method comprising: forming a single piece upper crown member of steel having a central body portion, an outer annular sidewall depending from said body portion for receiving at least one ring groove, and an annular connecting collar depending from said body portion in radially inwardly spaced relation to said sidewall and presenting a joining face at a lower free end thereof; forming a single piece lower crown member of steel as a discrete component separate from said upper crown member and including, as part of the one piece lower crown member structure, a pair of pin boss portions, a pair of oppositely disposed skirt portions formed as one piece with and bridging said pin boss portions, and an annular connecting collar extending upwardly from the pin boss portions and presenting a joining face at a free end thereof; bringing the aligned joining face of the upper crown member into engagement with the joining face of the lower crown member; and friction-welding the connecting collars together to produce a permanent friction-weld joint across the joining faces in such manner as to secure the upper crown member intimately to the lower crown member to provide a resultant unified one-piece construction of the joined crown members, and wherein during the step of friction welding, forming a resultant flashing of material at the joining faces extending circumferentially about the connecting collars and projecting radially outwardly of the connecting collars toward said skirt portions, wherein the piston is formed with a cooling chamber between the sidewall and the central body portion of the upper crown member and wherein the flashing of weld material is accessible from outside the piston through the cooling chamber and including removing the flashing of material projecting radially outwardly of the connecting collars following welding.*

*5. A method of making a piston having a crown and a skirt formed as one piece with the crown, said method comprising: forming a single piece upper crown member of steel having a central body portion, an outer annular sidewall depending from said body portion for receiving at least one ring groove, and an annular connecting collar depending from said body portion in radially inwardly spaced relation to said sidewall and presenting a joining face at a lower free end thereof; forming a single piece lower crown member of steel as a discrete component separate from said upper crown member and including, as part of the one piece lower crown member structure, a pair of pin boss portions, a pair of oppositely disposed skirt portions formed as one piece with and bridging said pin boss portions, and an annular connecting collar extending upwardly from the pin boss portions and presenting a joining face at a free end thereof; bringing the aligned joining face of the upper crown member into engagement with the joining face of the lower crown member; and friction-welding the connecting collars together to produce a permanent friction-weld joint across the joining faces in such manner as to secure the upper crown member intimately to the lower crown member to provide a resultant unified one-piece construction of the joined crown members, and wherein during the step of friction welding, forming a resultant flashing of material at the joining faces extending circumferentially about the connecting collars and projecting radially outwardly of the connecting collars toward said skirt portions, wherein the flashing of material also extends radially inwardly of the connecting collars following welding, and wherein the lower crown member is constructed such that the flashing of material that extends radially inwardly of the connecting collars is formed to be open to a space defined between radially inner-most margins of the pin bosses.*

*6. The method of claim 5 including removing the flashing of material that extends radially inwardly of the connecting collars following welding.*

* * * * *